(12) United States Patent
Okada et al.

(10) Patent No.: US 6,552,649 B1
(45) Date of Patent: Apr. 22, 2003

(54) VEHICLE CONTROL SYSTEM

(75) Inventors: Hiroki Okada, Toyota (JP); Keiji Yamamoto, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/328,340

(22) Filed: Jun. 9, 1999

(30) Foreign Application Priority Data

Jun. 18, 1998 (JP) .......................................... 10-171227
Dec. 18, 1998 (JP) .......................................... 10-361440

(51) Int. Cl.$^7$ ............................................. G05B 19/00
(52) U.S. Cl. ...................... 340/5.61; 340/5.62; 340/5.2; 340/5.8; 340/10.3; 340/10.33; 340/5.72; 340/825.69; 340/825.72; 307/10.1
(58) Field of Search ................................. 340/5.61, 5.62, 340/5.2, 5.8, 10.3, 10.33, 5.72, 10.1, 10.52, 825.69, 825.72; 307/10.1

(56) References Cited

U.S. PATENT DOCUMENTS

| | | | | |
|---|---|---|---|---|
| 4,763,121 A | * | 8/1988 | Tomoda et al. ............ | 340/5.61 |
| 5,532,709 A | * | 7/1996 | Talty ......................... | 343/819 |
| 5,600,323 A | | 2/1997 | Boschini .................... | 341/173 |
| 5,973,611 A | * | 10/1999 | Kulha et al. ............... | 340/5.62 |

FOREIGN PATENT DOCUMENTS

| | | |
|---|---|---|
| EP | 0 502 567 A1 | 9/1992 |
| EP | 0 629 759 A1 | 12/1994 |
| EP | 0 735 219 A2 | 10/1996 |
| JP | 5-71257 | 3/1993 |
| JP | 5-106376 | 4/1993 |
| JP | 5-156851 | 6/1993 |
| JP | 7-150835 | 6/1995 |

* cited by examiner

*Primary Examiner*—Michael Horabik
*Assistant Examiner*—Yves Dalencourt
(74) *Attorney, Agent, or Firm*—Pillsbury Winthrop LLP (57) ABSTRACT

In a vehicle control system that is able to accurately recognize an approaching user, excessive detection operations are suppressed to reduce battery consumption. Control is performed at an optimum timing as desired by a user. The vehicle has a controller for forming a large area, using low power electromagnetic radiation. Within the large area, a large area ID request signal can be received. When a portable transceiver enters the large area and returns a response ID in reply to the large area ID request signal back to the controller of the vehicle, the controller then forms a plurality of small areas in which a small area ID request signal for detailed detection can be received. When it is confirmed that the portable transceiver entered any of the small areas, the controller unlocks the vehicle door associated with that small area, allowing the user to enter the vehicle.

21 Claims, 9 Drawing Sheets

VEHICLE CONTROL SYSTEM

BACKGROUND OF THE INVENTION

1. Field of the Invention

The present invention relates to a vehicle control system, and particularly to a vehicle control system for controlling a vehicle-mounted device, using a portable transceiver (transmitter/receiver).

2. Description of the Related Art

As vehicles become more intelligent, many proposals have been made to control vehicles with less operator effort. Japanese Patent Laid-open Publication No. Hei 5-71257, for example, discloses an automatic door-lock device which can automatically lock or unlock vehicle doors without a manual operation for locking or unlocking. This device, referred to as a smart entry system, unlocks a vehicle door when it detects a user coming close to the vehicle, and locks the door when it detects a user going away from the vehicle. Specifically, when a dedicated portable transceiver carried by a user receives an ID request signal sent from a vehicle, the transceiver returns a corresponding response ID to the vehicle. When the response ID is confirmed as an authorized response ID on the vehicle side, a door of the vehicle is duly unlocked, while otherwise the doors are kept locked. In this manner, an authorized user can automatically unlock the door without manual operation when he enters the vehicle. Likewise, when the user simply leaves the vehicle without conducting manual door-lock operation, the vehicle door can thereby be locked automatically. With the above arrangement, the user is released from the risk of leaving the door unlocked and the duty of troublesome door-lock operation.

In the above smart entry system, a vehicle must continually send ID request signals to search for a portable transceiver carried by a user. When a transmission area for the ID request signals is set covering too vast a region, a user approaching the vehicle cannot be easily recognized. For example, a user who only passes near the vehicle may erroneously be understood as a user preparing to enter the vehicle, and the door may erroneously be unlocked before the authorized user reaches the vehicle. This is undesirable in view of crime prevention as it may cause a risk that a third person would get on the vehicle.

To solve the above problem, the transmission area can be made smaller to aid accurate determination of whether a user is in fact approaching the vehicle. However, this arrangement is not desirable in terms of control as it may require formation of a number of detection areas using a number of detection means for full-time observation, leading to heavy use of the vehicle's battery. These problems, such as early control timing and waste of battery power, also can occur when vehicle-mounted devices other than a door-lock mechanism are controlled.

SUMMARY OF THE INVENTION

The present invention was conceived to overcome the above problems and aims to provide a vehicle control system capable of accurately recognizing approach by a user and controlling a vehicle-mounted device at an optimum timing while suppressing battery consumption.

In order to achieve the above object, according to the present invention, there is provided a vehicle control system, comprising large area ID request means for sending an ID request signal to a portable transceiver present in a specific area around a vehicle to form a large area; ID verification means for receiving a response ID in reply to the ID request signal to conduct verification with the response ID received; area switching means for activating at least one detection means using a detection area smaller than the larger area when the response ID received is verified coincident with a reference ID; and control means for controlling operation of a vehicle-mounted device based on a detection result by the detection means.

Here, a "large area" represents a detection area with relatively low detection accuracy which is formed having a radius of approximately 10 m with the vehicle at the center. A "small area" represents a detection area with high detection accuracy, which is formed in a region close, e.g., within 1 m in radius, to a specific point on the vehicle, such as the driver seat door or a passenger seat door. A "vehicle-mounted device" may include a door-lock controller, a lighting controller, an engine starting controller, a driving condition controller, and so on.

With the above arrangement, since the detection means using a small area is activated after confirmation was made that a user carrying a portable transceiver entered the large area formed around the vehicle, highly accurate detection operation using a small area is carried out only when the user has approached sufficiently close to the vehicle. That is, as such detection, which consumes a relatively large amount of battery power, is performed only in the case where the user has approached sufficiently close to the vehicle, wasteful consumption of battery power can be suppressed. In addition, when highly accurate detection is carried out using a small area, approaching state of a user to the vehicle can be highly accurately detected. As a result, the vehicle-mounted device can be controlled at the optimum timing.

As stated above, in the above vehicle control system, the control means may control a door-lock controller for controlling locking/unlocking operation with respect to doors of the vehicle.

With this arrangement, verification with a reference ID for door unlocking operation completes at a timing when a user carrying a portable transceiver enters the large area. This enables subsequent swift and reliable recognition of a user in a small area, so that the door can be smoothly unlocked at the optimum timing. The control means also locks the door in response to a user carrying a portable transceiver going away from the large area.

Additionally, in the above vehicle control system, the large area ID request means may form a first large area and a second large area in lateral directions with respect to the vehicle on a driver side and a passenger side, respectively, at a predetermined timing, and the area switching means activates individually at least one detection area formed either on the driver side or the passenger side of the vehicle, based on a response ID sent from a portable transceiver having entered at least one of the first large area or the second large area.

The large area ID request means may form the first and second large areas either at the same or different timing.

With the above arrangement, as only the detection means on the side to which a user carrying a portable transceiver approaches is activated, wasteful battery consumption can be further reduced. Moreover, as preparation for, and execution of, door-unlocking operation is applied only to the doors on the side with an approaching user, intrusion by the third person to the vehicle through the doors on the other side can be prevented for improved security. Further, formation of the first and second large areas at different timing can further reduce wasteful battery consumption.

Yet further, in the above vehicle control system, the detection means may be small area ID request means for sending an ID request signal which is different from the ID request signal to be sent to the large area, and the control means controls operation of the vehicle-mounted device when the ID verification means verifies that a response ID in reply to the ID request signal sent from the small area ID request means coincides with a reference ID.

With this arrangement, as ID verification is made twice, detection reliability for an authorized user is improved, as is security in door unlocking operation.

Yet further, in the above vehicle control system, the detection means may be a body detection sensor for detecting an approaching vehicle user.

Here, "body detection sensor" may include a photo-sensor or any other sensor which can detect, for example, a user's hand extended to the door knob because the user intends to opening the door, based on a changing gain of the antenna incorporated into, for example, the door knob.

With this arrangement, approach of a portable transceiver (i.e., a user) can be accurately detected. Moreover, as ID verification completes at a timing where the portable transceiver (i.e., a user) enters the large area, subsequent processing to the detection using a small area can be simplified, enabling prompt controlling of the vehicle-control system.

Yet further, the above vehicle control system, may further comprise operation area selection means for selectively activating one detection means, the one being associated with a specific location.

Here "specific detection means associated with a specific location" indicates detection means for detecting approach by a user or a portable transceiver to, for example, the driver seat door. The detection means can perform minimum detection so as not to impede a user's smooth entry to the vehicle, even when the battery is left less than a predetermined amount. With this arrangement, the function of the vehicle control system can be utilized while reducing battery consumption.

Yet further, the above vehicle control system, may further comprises area changing means for changing a transmission area for the ID request signal sent from the small area ID request means.

With this arrangement, a transmission area for an ID request signal from the small ID request means can be desirably determined. That is, with a small transmission area, excessive user detection will be prevented when, for example, the vehicle is in a narrow space, such as in a garage, leaving little space around the vehicle and the user may have to pass near the vehicle even when he does not intend to get on the vehicle. An approaching user can be accurately recognized and his intention of getting on the vehicle can be precisely confirmed. On the other hand, with a large transmission area, control over the vehicle-mounted device can be begun at an early stage.

Still further, in the above vehicle control system, the area switching means suspends operation of detection means associated with an unlocked door.

With such an arrangement, as operation of the detection means on a door once used by the user carrying a portable transceiver is suspended, battery consumption can be reduced while, as other detection means continue to operate despite the suspension, approach to other doors by other users carrying other portable transceivers with an authorized ID can be detected, so that associated doors will be promptly unlocked for the user's smooth entry to the vehicle.

Yet further, the above vehicle control system may further comprise driven state detection means for detecting a driven state of the vehicle, and operation suspension means for suspending operation of the large area ID request means and the detection means while driven state of the vehicle is kept detected.

With this arrangement, when it is assured that the vehicle is in a condition being controlled by the user himself, by detecting a driven state of the vehicle, for example, activation of an engine or travelling of the vehicle, in other words, the fact that the user has gotten in the vehicle, operation of the large area ID request means and the detection means is suspended. As a result, battery consumption is reduced.

Still further, in the above vehicle control system, the large area ID request means may send a wake-up signal at a predetermined interval for detecting whether or not a portable transceiver is present around the vehicle, and forms the first large area and the second large area based on a predetermined priority order when presence of the portable transceiver is confirmed.

A "wake-up signal" may preferably be transmitted at a relatively long interval, such as, for example, 300 msec. With this arrangement, as a large area is swept intermittently, battery consumption is further reduced. Also, alternate formation of the first and second large area enables further reduction of battery consumption while achieving reliably detection of approach by a portable transceiver

BRIEF DESCRIPTION OF THE DRAWINGS

The above and other objects, features, and advantages of the present invention, will become further apparent from the following description of the preferred embodiment taken in conjunction with the accompanying drawings wherein.

DESCRIPTION OF THE PREFERRED EMBODIMENTS

In the following, preferred embodiments of the present invention will be described referring to the accompanying drawings.

Embodiment 1

Figure 1:
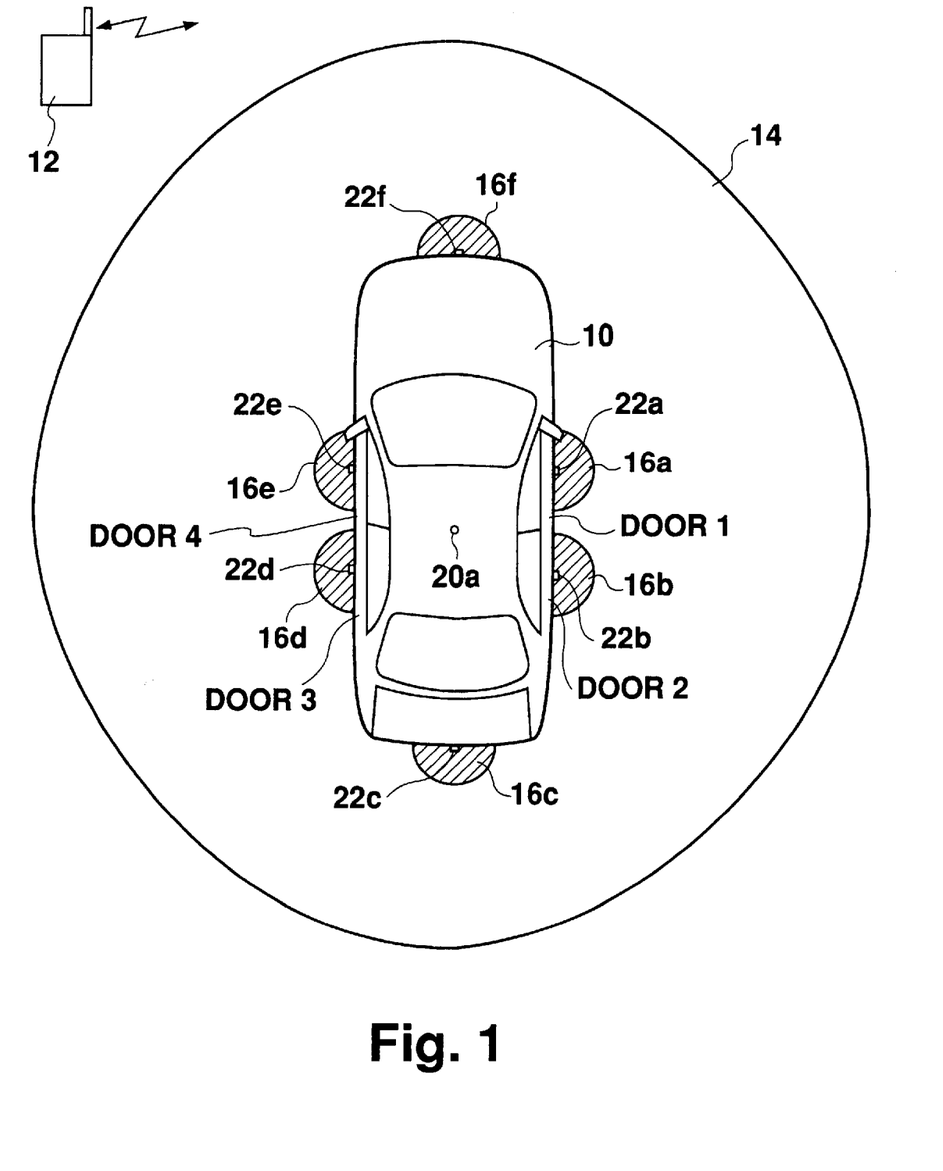
FIG. 1 is a diagram explaining a detection area for a portable transceiver of a vehicle control system according to a first preferred embodiment of the present invention.

FIG. 1 is a schematic diagram showing detection areas formed by a vehicle control system according to a first embodiment of the present invention, to detect a user (i.e., a portable transceiver (transmitter/receiver) 12 carried by a user) approaching a vehicle 10.

The first embodiment is characterized by the fact that detection area consists of a large area 14 and a plurality of small areas 16a–16f. The large area 14 is formed with the vehicle 10 at a center, while a plurality of (six in the first embodiment description) small areas 16a–16f, each being smaller than the large area 14, are formed around the vehicle 10. The large area 14 and the small areas 16a–16f are switched for use, depending on the approaching state of a portable transceiver 12 to the vehicle 10, for accurate detection of approach of the portable transceiver 12 (i.e., the user).

The large area 14 is, for example, a substantially circular detection area formed with the vehicle 10 at the center and may have a radius of, for example, 10 m. Specifically, the large area 14 is an area reachable for a large area signal, a signal carried by an electric wave of a high frequency (e.g., an order of a few hundreds MHz). A portable transceiver 12 in the large area 14 is detected by the vehicle-side system recognizing a response signal sent from the transceiver 12 in reply to a large area signal.

The small areas 16a–16f each are, for example, a substantially round detection area formed having a 1 m radium, and, specifically, is an area reachable for a small area signal, a signal carried by an electric wave of a low frequency (e.g., an order of a few KHz). A portable transceiver 12 having entered any of the small areas 16a–16f is detected by the vehicle-side system recognizing a response signal sent from the transceiver 12 in response to a small area signal, and the vehicle-mounted device is then controlled.

Figure 2:
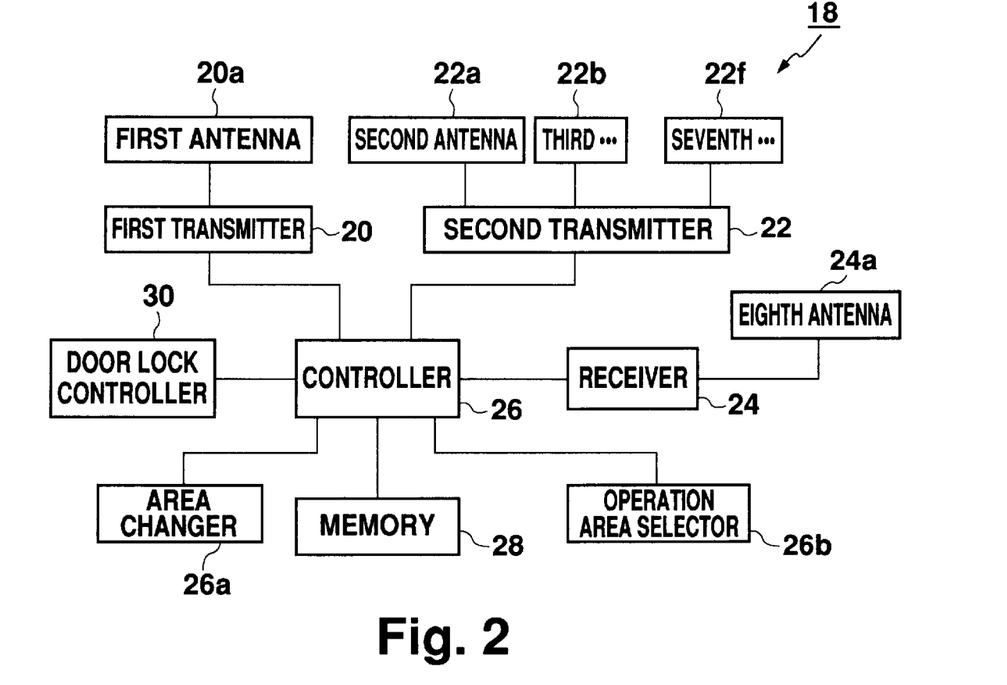
FIG. 2 is a block diagram depicting a structure of a vehicle-side system of a vehicle control system according to the first preferred embodiment of the present invention.

FIG. 2 is a conceptual diagram schematically showing a structure of a vehicle-side system 18 of the vehicle control system according to the first embodiment. The vehicle-side system 18 includes a first transmitter 20, a second transmitter 22, a receiver 24, and a controller 26, the former three being connected to the controller 26. The first transmitter 20 sends, as a large area signal, a large area ID request signal containing a predetermined ID code. The second transmitter 22 sends, as a small area signal, a small area ID request signal containing a predetermined ID code. The receiver 24 receives a response signal which is a response ID signal containing a predetermined ID sent from a portable transceiver 12 in reply to a large or small area ID request signal. The controller 26 is responsible for comprehensive control over the entire system.

The first transmitter 20 is connected to a first antenna 20a, installed, for example, at the middle of the roof of the vehicle 10, together constituting a large area ID request means. The second transmitter 22 is connected to second to seventh antenna 22a–22f, together constituting a small area ID request means which acts as a detection means. The second, third, fifth, and sixth antennas 22a, 22b, 22d, 22e are installed, for example, each on each door, as shown in FIG. 1, and the fourth and seventh antennas 22c, 22f are installed near the rear and front bumpers, respectively. The receiver 24 is connected to an eighth antenna 24a, which may be installed at a desired point on the vehicle 10. Note that each antenna has a size and shape which do not damage the vehicle 10 design, and is installed on a desired point on the vehicle 10 such that they do not hamper the functions of the vehicle 10.

The controller 26 is also connected to a memory 28, which comprises a ROM or the like. The memory 28 stores reference IDS to be compared for verification with response IDs, the response IDs being sent from a portable transceiver 12 in reply to a large or small area ID request signal sent thereto by the first or second transmitter 20 or 22. Note that the controller 26 is further connected to a vehicle-mounted device, such as a door lock controller 30, and controls the device when it recognizes an approaching portable transceiver 12 (i.e., the user) based on a signal received by the receiver 24. A vehicle-mounted device may include a lighting controller, an engine starting controller, and a driving condition controller for optimum steering and/or sheet positions for each user). The receiver 24, the eighth antenna 24a, the controller 26, the memory 28, and so on together constitute an ID verification means. The controller 26 includes an area switching means for activating detection means using small areas 16a–16f as a detection area when a response ID is verified to coincide with a reference ID.

Figure 3:
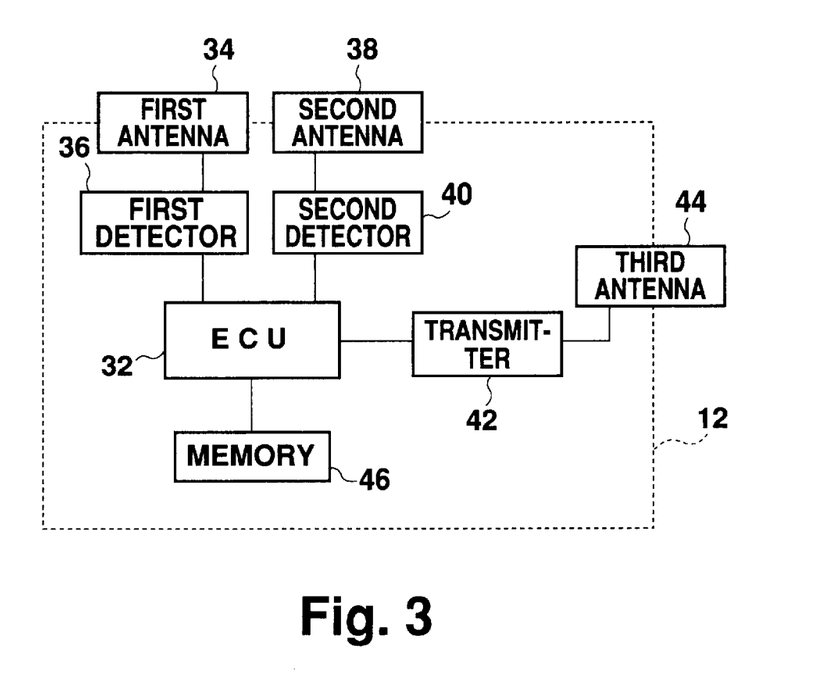
FIG. 3 is a diagram explaining a structure of a portable transceiver of a vehicle control system according to the first preferred embodiment of the present invention.

FIG. 3 is a block diagram showing a structure of the portable transceiver 12. Preferably, the portable transceiver 12 is incorporated into, for example, the grip of an ignition key, a key holder which can be easily attached to ignition or other keys, or the like. The portable transceiver 12 has a structure including an electric control unit (ECU) 32 as a major component. The ECU 32 is connected to a first detector 36, a second detector 40, and a transmitter 42. The first detector 36 is also connected to a first antenna 34 for receiving a large area ID request signal, and the second detector 40 is also connected to a second antenna 38 for receiving a small area ID request signal. The transmitter 42 is also connected to a third antenna 44 for, via which, sending a response ID signal in reply to a large or small area ID request signal. The ECU 32 is further connected to a memory 46 for storing response ID signals to be read therefrom when needed.

Next, the operation of the vehicle-side system 18 of the vehicle control system will be described referring to the flowchart shown in FIG. 4.

When the ignition key of a vehicle 10 is not inserted, the controller 26 activates the first antenna 20a via the first transmitter 20 (S100) to form a large area 14, as shown in FIG. 1. A larger area 14 is an area reachable for an electric wave carrying a large area ID request signal, as described above, and formed using electric waves of small power and a high frequency (e.g., approximately 300 MHz) which can create a detection area dimly covering a relatively large region. When a user with a portable transceiver 12 enters the large area 14, and the first detector 36 of the portable transceiver 12 receives, via the first antenna 34, a large area ID request signal, the ECU 32 immediately reads a corresponding response ID from the memory 46, and sends the response ID signal via the transmitter 42 and the third antenna 44. The transmitter 42 uses a transmission frequency of, e.g., 300 MHz.

In the vehicle-side system 18, the response ID is received via the eighth antenna 24a (whose receiving frequency may be, e.g., 300 MHz) by the receiver 24, and the controller 26 then reads a reference ID for a large area (a reference ID-1) from the memory 26 for comparison with the received response ID (S101). When they are verified to coincide with each other, the controller 26 suspends operation of the first transmitter 20 (the first antenna 20a), and simultaneously activates, via the second transmitter 22, the second to seventh antenna 22a–22f (S102) to form small areas 16a–16f, as shown in FIG. 1. Small areas 16a–17f each are an area reachable for an electric wave carrying a small area ID request signal, as described above, and formed using electric waves of a low frequency (e.g., approximately 125 KHz) which can create a detection area intensively covering a relatively small area.

Once small areas 16a–16f are formed, small area ID request signals are sent individually via associated antennas. Then, when the user carrying a portable transceiver 12 further approaches the vehicle 10, the transceiver 12, particularly the second detector 40 thereof, can receive via the second antenna 38 a small area ID request signal associated with any of the small areas 16a–17f. When any small area ID request signal is received, the ECU 32 immediately reads a response ID corresponding to the received small area ID, from the memory 46, and sends the response ID signal via the transmitter 42 and the third antenna 44.

With the response ID received in the vehicle-side system 18, the controller 26 compares the received response ID with reference IDs sequentially read from the memory 28 to see with which of the reference IDs the received ID coincides. Note that reference ID-2 corresponds to a small area 16a; reference ID-3 corresponds to a small area 16b; reference ID-4 corresponds to a small area 16c; reference ID-5 corresponds to a small area 16d; reference ID-6 corresponds to a small area 16e; and reference ID-7 corresponds to a small area 16f. Provide that the received response ID is verified to coincide with reference ID-2 (S103). Then, the number of times when they coincide with each other, or N, is detected. Specifically, whether or not N is equal to or more than a predetermined time, e.g., five, is determined (S104). With this determination, whether or not the user with a portable transceiver 12 stays in the small area 16a for more than a predetermined time period, can be decided. The detection is made based on the understanding that a user staying in the same small area for more than a predetermined time period is more likely to attempt to enter the vehicle 10 through the associated door. Therefore, when N is judged as equal to or more than five, the door associated with the small area 16a, namely door 1, is unlocked (S105). Then, whether or not the user with the portable transceiver 12 moved to another door, in other words, whether or not the user attempts to open another door from the outside of the vehicle 10, is detected. For this purpose, a received response ID is again compared with a reference ID for a small area for verification at S103. Meanwhile, when the detection at S104 proves that the number of times of the coincident N is less than five, whether the user remains in the small area 16a or moved to another small area is then detected. Specifically, a receivable response ID is again compared with a reference ID for a small area for verification at S103.

When the controller 26 determines at S103 that the received response ID does not coincide with a reference ID-2, that response ID is further compared with other reference IDs sequentially read from the memory 28. Provide that the response ID coincides with a reference ID-3 (S106). Then, whether or not the number of times of the coincidence, or N, is equal to or more than a predetermined time, e.g., five, is detected (S107), similar to the case with reference ID-2. When it is confirmed that the user stays in the small area 16b for more than a predetermined time period, the user might be understood as getting on the vehicle 10 through the associated door, i.e., door 2 in this case, and the door 2 is therefore unlocked (S108). After the door 2 was unlocked, the operation flow returns to S103 to determine whether or not a received response ID coincides with other reference IDS.

Specifically, ID verification is carried out as above, sequentially using reference ID-4 corresponding to a small area 16c for unlocking a trunk (S109–S111), using a reference ID-5 corresponding to a small area 16d for unlocking door 3 (omitted in the flowchart), using a reference ID-6 corresponding to a small area 16e for unlocking door 4 (omitted in the flowchart), and using a reference ID-7 corresponding to a small area 16f for unlocking a hood (S112–S114).

When a user carrying a portable transceiver 12 moves from the front of the vehicle 10 through the small area 16f to the small area 16a, the door 1 on the driver side is unlocked. When the user moves through the small areas 16f, 16a, and 16b in this order, the door 2 is unlocked with an expectation that the user may open the rear door on the driver side. Further, when the user stays in the small area 16e for a moment and then moves to the small area 16f and further to the small area 16a, the doors 4 and 1 are unlocked in this order with an expectation that the user may open the door 4 on the passenger side and then gets on the vehicle 10 through the door 1 on the driver side. In this manner, door unlocking operation is carried out according to the user's behavior.

When the received response ID does not coincide with any of the reference IDs 2–7, or when the received response ID ceases to so coincide, the controller 26 then detects whether or not any door is unlocked (S115). When no unlocked door is detected, the controller 26 then determines that the user with the portable transceiver 12 approached the vehicle 10 for a purpose other than operation of the vehicle 10, and suspends operation of the second to seventh antennas 22a–22f, thereby halting intensive user-approach detection using many small areas (S116). Instead, the first antenna 20a is activated (S100) thereby resuming rough, large area user-approach detection.

In contrast, when an unlocked door is detected at S115, the controller 26 halts operation of the second to seventh antennas 22a–22f, and activates the first antenna 20a (S117) to send a large area ID request signal for detection of the presence of a portable transceiver 12 (i.e., a user). Then, whether or not a response ID is sent from a portable transceiver 12 in reply to the large area ID request signal (i.e., a response ID coincident with a reference ID-1), is detected (S118). When such a response ID is identified and when the response ID coincides with reference ID-1 ten or more times (S119), the controller 26 determines that a portable transceiver 12 (i.e., a user) is present within the large area 14 formed surrounding the vehicle 10. After the determination, the controller 26 suspends operation of the first transmitter 20 (the first antenna 20a) and simultaneously activates, via the second transmitter 22, the second to seventh antenna 22a 22f (S102) for accurate location of the portable transceiver 12 (i.e., the user), as described above. On the other hand, when the controller 26 fails to verify at S118 that the received response ID coincides with a reference ID-1, it is then determined that a portable transceiver 12 (i.e., the user) has moved out of the large area 14, in other words, it has moved away from the vehicle 10. The controller 26 then locks any unlocked door, if any, (S120) before processing at S101 and thereafter is repeatedly carried out for detection of a user entering the large area 14.

As described above, the controller 26 selectively switches, according to a user's approach to the vehicle 10, detection areas between a large area for rough detection and small areas for intensive detection using a plurality of detection means for detection of a portable transceiver 12. That is, when a user is away from the vehicle, too intensive detection is not applied so that driving power can be saved thereby reducing battery consumption. Moreover, as approaching state of a portable transceiver 12 (i.e., a user) to a vehicle 10 can be accurately recognized through detection using a small area, a door lock mechanism can be controlled at an optimum timing.

Note that small areas 16a–16f may be set having a desirable radius, other than the example radius of 1 m used in the above description. This can be achieved through provision of an area changer 26a to the controller 26, which changes a transmission area for a small area ID request signal. For example, a user may pass near the vehicle 10 without an intention of getting on the vehicle 10 in a small parking lot. Under such circumstance, if the door is unlocked when it is unnecessary or door unlocking/locking operation is repeatedly carried out, the user may feel uneasy, and security may be deteriorated. Therefore, in a situation where a user may often pass near the vehicle, the radius of each of the small areas 16a–16f may be set at, for example, 0.5 m or 0.3 m to prevent the above inconvenience.

Further, an operation area selector 26b may be provided connected to the controller 26, for selectively forming only a specific small area or areas. For example, when the battery of the vehicle 10 is reduced below a predetermine amount level, which is recognized by the controller 26, the operation area selector 26b forms only a predetermined small area or areas. That is, in order to achieve smart-entry control over at least a door needed to be thus controlled, e.g., the door 1 on the driver side, only the small area 16a is automatically formed. With this arrangement, battery consumption can be further reduced. Also, the provision of an operation area selector 26b allows a user to freely and desirably form a small area or areas 16a–16f. This enables controlling of, for example, only the doors on the driver and passenger sides.

In the above, all doors, including a trunk and hood, are controlled equally. However, as a trunk and hood are less frequently opened than other doors, associated detection areas and the number of coincidence times N may be set using the controller 26, the area changer 26a, the operation area selector 26b, and so on, such that excessively reactive detection is prevented.

Also, when the vehicle 10 is located near a TV transmission tower or other source of electromagnetic radiation on the order of a few hundred MHz, the electric waves from the TV tower may act as disturbance waves on the vehicle control system of the present invention, suppressing the electric waves used in the first embodiment and deteriorating detection sensitivity. In such a situation, the controller 26 may be unable to recognize a response ID sent with respect to a large area ID request signal (a response ID corresponding to a reference ID-1). Specifically, as shown in the flowchart of FIG. 4, when no reply is returned from a portable transceiver 12 despite 100 or more times of transmission of a large area ID request signal (S121), it is determined that there exists any external factor which disturbs the electric waves of the system, and detection may be switched to use the second to seventh antenna 22a–22f, which use a relative low frequency less subject to the above disturbance. With this arrangement, approaching state of a portable transceiver 12 can be reliably recognized even in the neighborhood of any disturbance factor, such as a transmission tower as described above.

Figure 4:
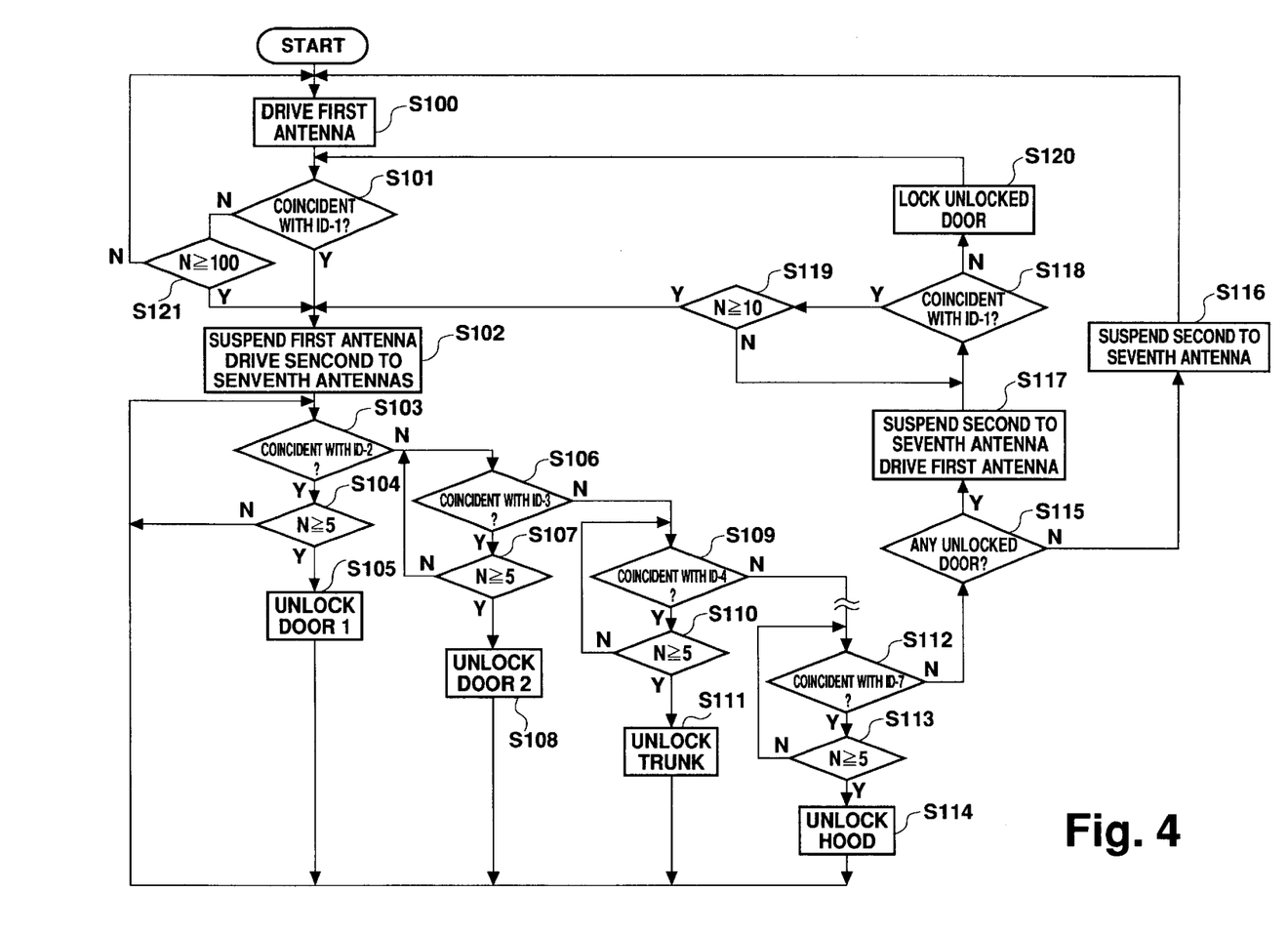
FIG. 4 is a flowchart explaining a process procedure followed by a vehicle-side system according to the first preferred embodiment of the present invention.

Note that the logic diagram in FIG. 4 is shown only as an example, and the same advantage as that of the first embodiment can be achieved using other logic patterns for switching between large and small areas depending on the approaching state of a portable transceiver 12.

Embodiment 2

In the first embodiment as described above, a user is located using a detection means which transmits small area ID request signals associated with small areas 16a–16f and recognizes a corresponding response ID. In a second embodiment of the present invention, a body detection sensor is used as a detection means.

Figures 5A, 5B:
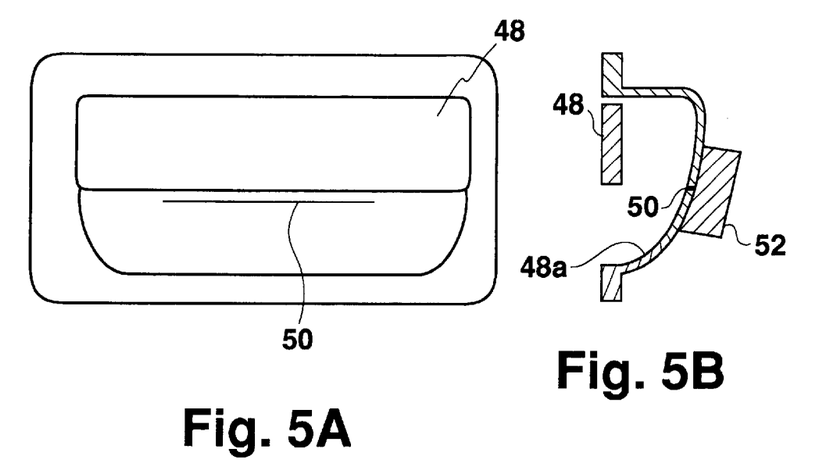
FIG. 5A is a front view of a man detection sensor applicable to a vehicle control system according to a second preferred embodiment of the present invention.
FIG. 5B is a sectional view of a body detection sensor applicable to a vehicle control system according to a second preferred embodiment of the present invention.
Figure 5C:
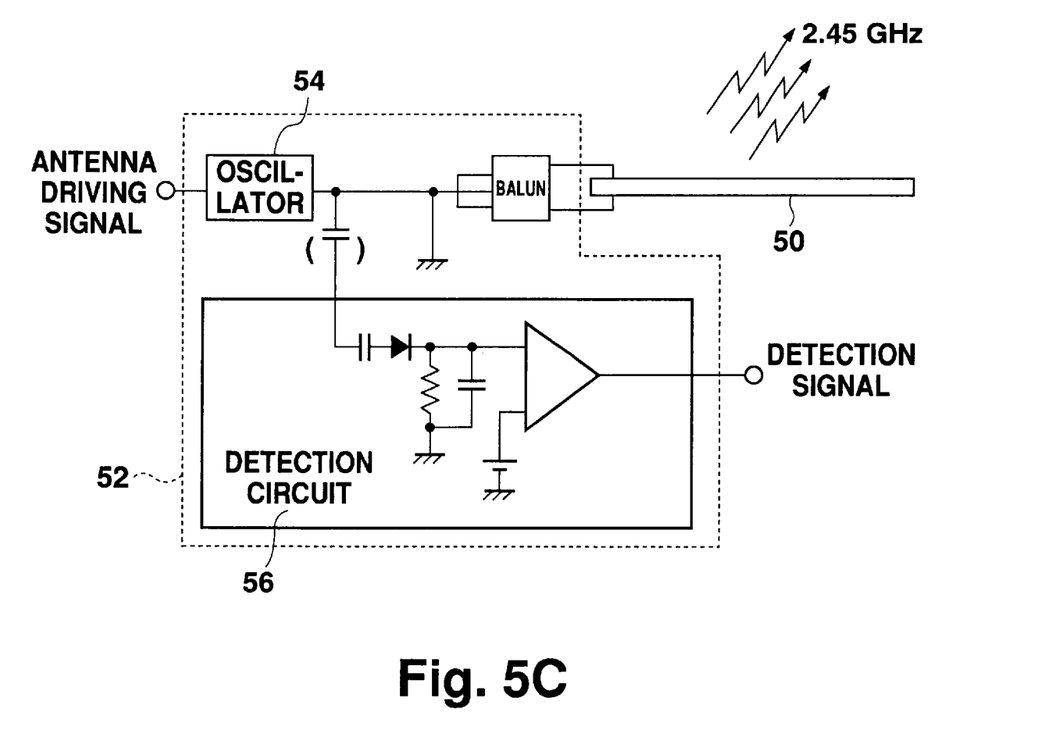
FIG. 5C is a block diagram showing a structure of a body detection sensor applicable to a vehicle control system according to the second preferred embodiment of the present invention.

FIGS. 5A–5C are diagrams showing an example of a body detection sensor. The example sensor is a slit type antenna 50 installed in a space 48a within a door knob 48, or the like. Such a sensor using a slit-type antenna 50 recognizes an approaching user, based on a changing antenna gain in response to a user's hand put close to the knob 48. The antenna 50 is driven by a control circuit 52, which is installed, for example, in the inside of the door. FIG. 5C shows a structure of the control circuit 52. In operation, the controller 26 (FIG. 2), having recognized a response ID corresponding to a large area ID request signal (reference ID-1), supplies an antenna driving signal to an oscillator 54 of the control circuit 52 (FIG. 5C), rather than driving the second transmitter 22, so that the slit type antenna 50 outputs an electric wave of, e.g., 2.45 GHz. When the detection circuit 56 detects a user's hand approaching the door knob 48 based on a changing antenna gain, the detection circuit 56 supplies a detection signal to the controller 26 so that the controller 26 unlocks the relevant door based on the detection signal. After unlocking the door, a response ID in reply to a large area ID request signal is given verification, similar to the first embodiment, to determine whether or not the portable transceiver 12 (i.e., the user) has moved away from the vehicle 10. When it is confirmed that the transceiver 12 has been out of the large area 14, the controller 26 locks any unlocked door.

As described above, the use of a body detection sensor can simplify the structure of the involved devices as it is sufficient to transmit only one type of ID between the vehicle-side system 18 and the portable transceiver 12. Further, since ID verification completes when the portable transceiver (i.e., the user) enters the large area, processing subsequent to the detection using small areas can be simplified, and therefore the vehicle-mounted device can be promptly controlled. Still further, since approach of a portable transceiver can be accurately detected, vehicle doors are not unlocked if it is unnecessary even when the vehicle is in a small parking lot or in other situations, such as those described above in the description of the first embodiment.

Note that, similar to the first embodiment, it may be arranged such that only a detection sensor, or sensors, arranged in a selected place or places on a vehicle are operated depending on the residual battery power. In this case, a body detection sensor on a driver side is preferably operated.

When a larger number of small areas than those in the first and second embodiments, i.e., six areas, are formed, a user (i.e., a portable transceiver 12) can be more precisely located, so that a vehicle-mounted device can be controlled more closely in response to the user's behavior. Further, in addition to or in place of the locking control over the vehicle doors, the trunk, and the hood, as described in the first and second embodiments, vehicle-mounted devices, such as, a lighting controller (an ignition key light, a foot light, and so on), an engine starting controller, a driving condition controller (mirror position, sheet position, and so on) may be activated upon detection of a user so that every condition with the vehicle 10 can smoothly be set ready for driving by the time the user gets in the vehicle 10.

Embodiment 3

Figure 6:
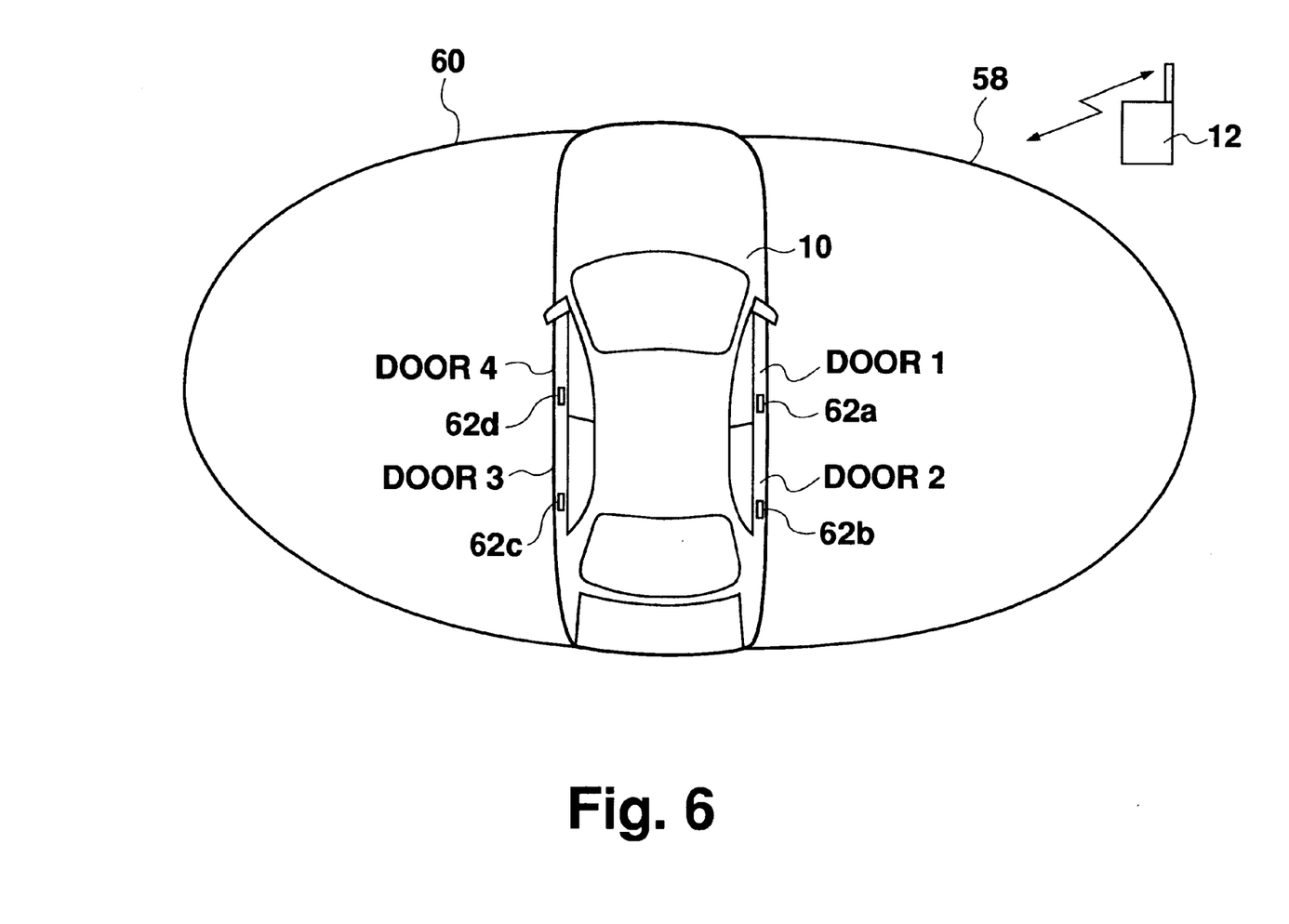
FIG. 6 is a diagram explaining a detection area for a portable transceiver of a vehicle control system according to a third preferred embodiment of the present invention.

In the second embodiment, once an approaching portable transceiver 12 in a large area is detected, all installed body detection sensors, including those not on the side on which the transceiver 12 was detected (e.g., a driver side ), are activated. However, this may deteriorate security, as causing a risk that the vehicle door might be opened by a third person (though this problem can be addressed by setting an appropriate range for a larger area 14). To prevent this problem, a large area may preferably be formed separately such that a first large area 58 is formed on the driver side while a second large area 60 is formed on the passenger side as shown in FIG. 6.

With separate formation of detection areas as above, an entered portable transceiver 12 in the first large area 58 will trigger operation of only the body detection sensors 62a, 62b installed on the doors 1 and 2 on the driver side Likewise, an entered portable transceiver 12 in the second large area 60 will trigger operation of only the body detection sensors 62c, 62d on the doors 3 and 4 on the passenger side. That is, preparation for door unlocking operation is made only with the doors on the side where a portable transceiver 12 (i.e., the user) approaches the vehicle 10. As a result, security deterioration can be prevented. Further, as body detection sensors are selectively activated, battery consumption can be reduced compared to a case, such as in the second embodiment, where all body detection sensors are simultaneously activated. Note that the first and second large areas 58 and 60 may be formed either simultaneously or alternately. Alternate formation can further reduce battery consumption.

Figure 7:
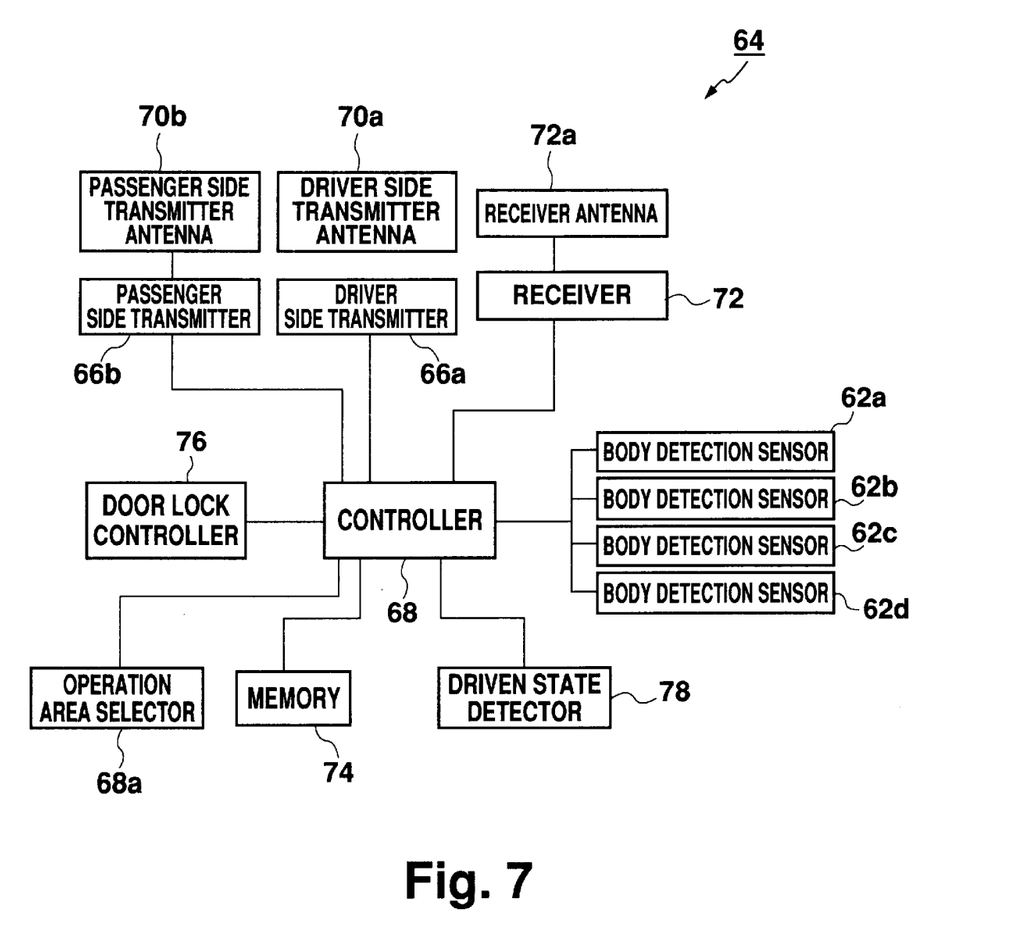
FIG. 7 is a block diagram depicting a structure of a vehicle-side system of a vehicle control system according to the third preferred embodiment of the present invention.

FIG. 7 is a conceptual diagram schematically showing a structure of a vehicle-side system 64 of the vehicle control system according to the third embodiment. In this system 64, a controller 68 for comprehensive control over the entire system is connected to a driver side transmitter 66a and a passenger side transmitter 66b. The driver side transmitter 66a sends, as a large area signal, a large area ID request signal containing a predetermined ID code to a portable transceiver 12 possibly present on the driver side of the vehicle 10. The driver side transmitter 66a is further connected to a driver side transmitter antenna 70a for forming a first large area 58, shown in FIG. 6, using a large area ID request signal. Likewise, the passenger side transmitter 66b, further connected to a passenger side transmitter antenna 70b, forms a second large area 60. The above transmitters and antenna, namely the drive seat side transmitter 66a, the driver side transmitter antenna 70a, the passenger side transmitter 66b, and the passenger side transmitter antenna 70b, together constitute a large area ID request means. The driver side transmitter antenna 70a may be incorporated into, for example, a door handle knob on the driver side of the vehicle 10, and the passenger side transmitter antenna 70b may be incorporated into, for example, a door handle knob on the passenger side. Note that the driver and passenger side transmitters 66a and 66b may be a single transmitter, differing from the above, where they are different entities.

The controller 68 is further connected to a receiver 72 for receiving, via a receiver antenna 72a, a response ID signal containing a predetermined ID, or a response signal, sent by a portable transceiver 12 in reply to a large area ID request signal. The receiver antenna 72a may be installed at a desired point on a vehicle for favorable signal reception.

The controller 68 is further connected to a memory 74, which comprises a ROM or the like. The memory 74 stores reference IDs to be compared for verification with response IDs, the response IDs being sent from a portable transceiver 12 in reply to a large area ID request signal sent by the driver and passenger side transmitters 66a and the 66b. An ID verification means included in the controller 68 verifies whether or not the received response ID coincides with a reference ID stored in the memory 74. When such verification is made, the controller 68 starts detection of a user carrying a portable transceiver 12 by activating any body detection sensors 62a–62d corresponding to either the first or second large area 58 or 60, to which the portable transceiver 12 entered. When the user's intention of opening the door is confirmed by any of the sensors 62a–62d, the controller 68 controls a door lock controller 76, mounted to the vehicle 10, to unlock the door associated with the body detection sensor having detected the user. Note that, to conserve battery power, the controller 68 is connected to a driven state detector 78 which determines whether or not door-lock control needs to be applied, based on driven state of the vehicle. The driven state detector 78 may include an activation detector for detecting activation of an engine or a speed detecting for detecting traveling of a vehicle. Note that the portable transceiver 12 according to the third embodiment may have the same structure as is shown in FIG. 3 excluding the second detector 40 and the second antenna 38.

Figure 8:
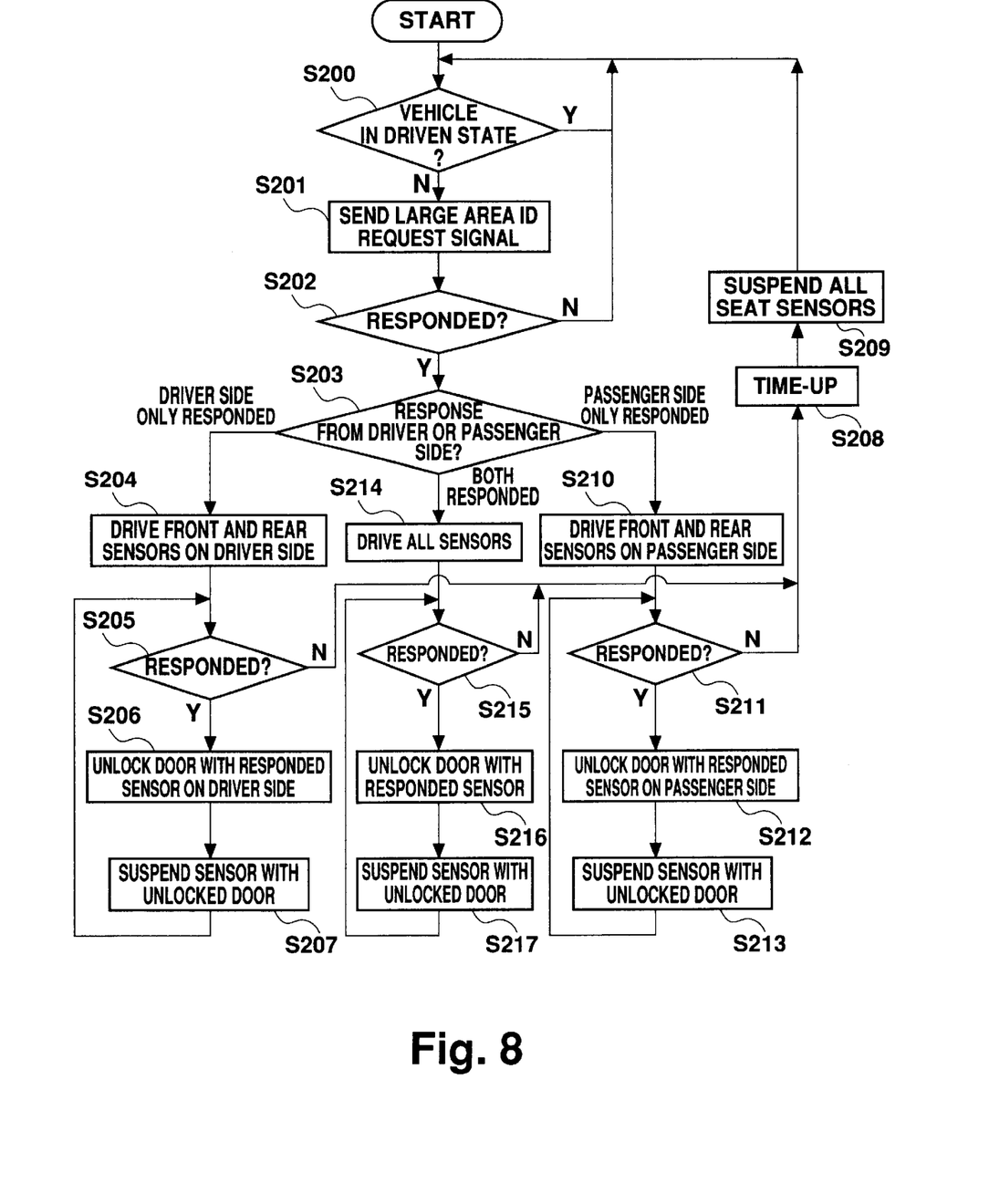
FIG. 8 is a flowchart explaining a process procedure followed by a vehicle-side system according to the third preferred embodiment of the present invention.

FIG. 8 is a flowchart showing door-lock control process using the structure shown in FIG. 7.

The controller 68 determines, based on an output from the driven state detector 78, whether or not the vehicle is in a driven state, e.g., in traveling state (S200). When such determination is positive, in other words, when a user is in the vehicle 10, the driven state of the vehicle is continually monitored and no large area ID request signals are sent as smart-entry control is unnecessary. Specifically, operation of the large area ID request means and the detection means is suspended by an operation suspension means included in the controller 68 thereby preventing battery consumption due to smart-entry control.

On the other hand, when it is confirmed at S200 that the vehicle is not in a driven state, the controller 68 activates the driver and passenger side transmitters 66a and 66b to send a large area ID request signal (S201) for formation of the first and second large areas 58 and 60, as shown in FIG. 6.

The controller 68 then detects whether or not the receiver 72 received a response ID via the receiving antenna 72a (S202). When no response was received, that is, when no authorized portable transceiver 12 is in either the first or second large area 58 or 60, the operation flow returns to S200 to send a large area ID request signal again based on the state of the vehicle 10 (S201). On the other hand, when any response is detected at S202, the controller 68 determines whether the response was sent from a portable transceiver 12 in the first large area 58 (on the driver side ) or in the second large area 60 (on the passenger side) (S203). Here, more than one portable transceiver 12 may be used for one vehicle. In such a case, a driver and passengers may respectively carry their transceivers 12 when approaching the vehicle. In this light, the controller 68 determines at S203 whether the response was detected on the driver side only, the passenger side only, or both the driver and passenger sides. Note that the driver and passenger side transmitters 66a and 66b may alternately send a large area ID request signal as it will be difficult to discriminate a direction in which a portable transceiver 12 approaches if they send the signals at the same time. With alternate signal output, the approaching direction of the portable transceiver 12 can be known from the transmission timing.

Referring to S203, when response is obtained only on the driver side (in the first large area), the sensors installed on the driver side, namely, the body detection sensor 62a (the front sensor) and the body detection sensor 62b (the rear sensor), are solely activated (S204). Subsequently, a determination is made as to whether or not the body detection sensors 62a or 62b is responding to the hand of a user with a portable transceiver 12 put close to the relevant door knob (S205). If the determination is affirmative, the controller 68 causes the door lock controller 76 to unlock the door associated with the responded sensor (S206). Once a door is unlocked, the body detection sensor associated with that unlocked door no longer needs to perform user detection operation. Therefore, operation of that sensor is suspended by an area switching means included in the controller 68 (S207). By suspending operation of a body detection sensor after use, wasteful battery consumption can be prevented. After the suspension at S207, the operation flow returns to S205, where whether or not the other body detection sensor on the driver side also responds, is detected. On the other hand, when neither of the active body detection sensors 62a and 62b responds at S205, after a predetermined time, such as, for example, five seconds, (S208), operation of all currently activated body detection sensors is suspended (S209) before the operation flow returns to S200. That is, it is determined that the user with a portable transceiver 12 has entered or does not intend to enter the vehicle 10 through the door on the driver side, and the first and second large areas are again formed based on the driven state of the vehicle 12 to resume detection of a portable transceiver 12. Operation of the body detection sensors thereafter remains suspended until recognition of a portable transceiver 12, so that battery consumption can be prevented.

Referring again at S203, when response is detected solely on the passenger side (the second large area), the body detection sensor 62d (a front sensor) and the body detection sensor 62c (a rear sensor) are driven (S210), and the controller 68 causes the door lock controller 76 to unlock only the door corresponding to the responded body detection sensor, similar to the above (S211–S213). When no sensor responds at S211, after a lapse of a predetermined time (S208), all currently driven body detection sensors are suspended S209). Thereafter, the first and second large areas are again formed based on the driven state of the vehicle 10 to resume detection of a portable transceiver 12.

Here, as described above, a plurality of authorized portable transceivers 12 may be used for one vehicle 10 (for family or company use). In such a case, individuals other than the driver may carry an authorized portable transceiver 12, and therefore, it is possible that, at S203, the body detection sensors on the driver side (the first large area) and on the passenger side (the second large area) may simultaneously receive a response ID which will be verified coincident with a reference ID. In this case, the controller 68 activates body detection sensors for all doors (S214), and, similar to the above, causes the door lock controller 76 to unlock only the door or doors corresponding to a responded body detection sensor (S215–S217). When no sensor responds (S215) after a lapse of a predetermined time period (S208), all body detection sensors are deactivated (S209). Thereafter, the first and second large areas are again formed based on the driven state of the vehicle 10 to resume detection of a portable transceiver 12.

As described above, when a first large area 58 and a second large area 60 are separately formed on the driver and passenger sides, respectively, driving of a body detection sensor installed on the side without a user carrying a portable transceiver 12 can be prohibited. As a result, security can be improved. Also, with prohibition against operating a body detection sensor on a door without possibility of a user's entry at that door, battery consumption can be reduced.

Similar to the aforementioned embodiments, it may be arranged such that door-lock control is performed only on the driver side according to the residual battery amount dropped below a predetermined level. In such a case, formation of a first large area only is preferred.

Figure 9:
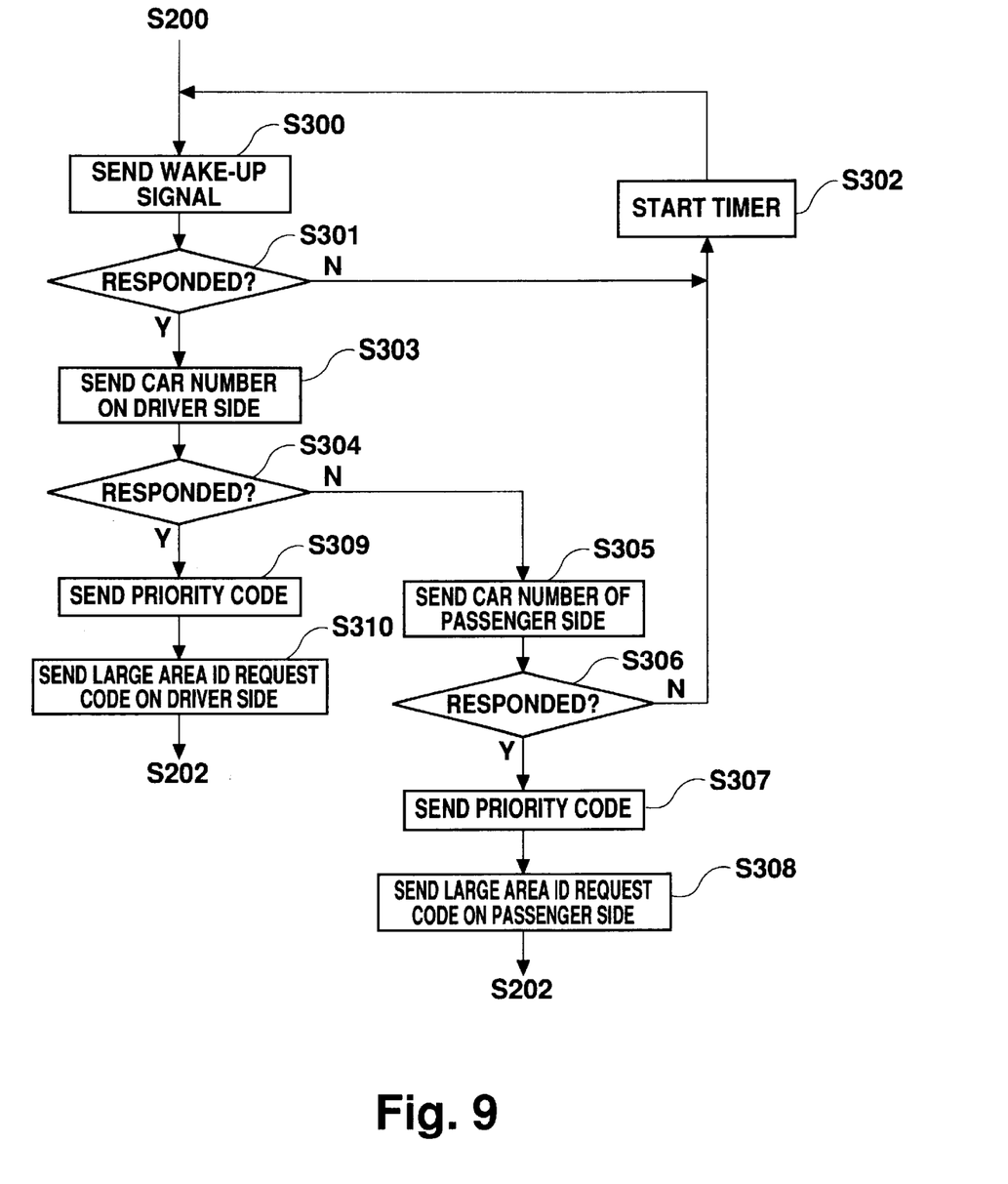
FIG. 9 is a flowchart explaining in detail a procedure to output a large area ID request signal.
Figure 10:
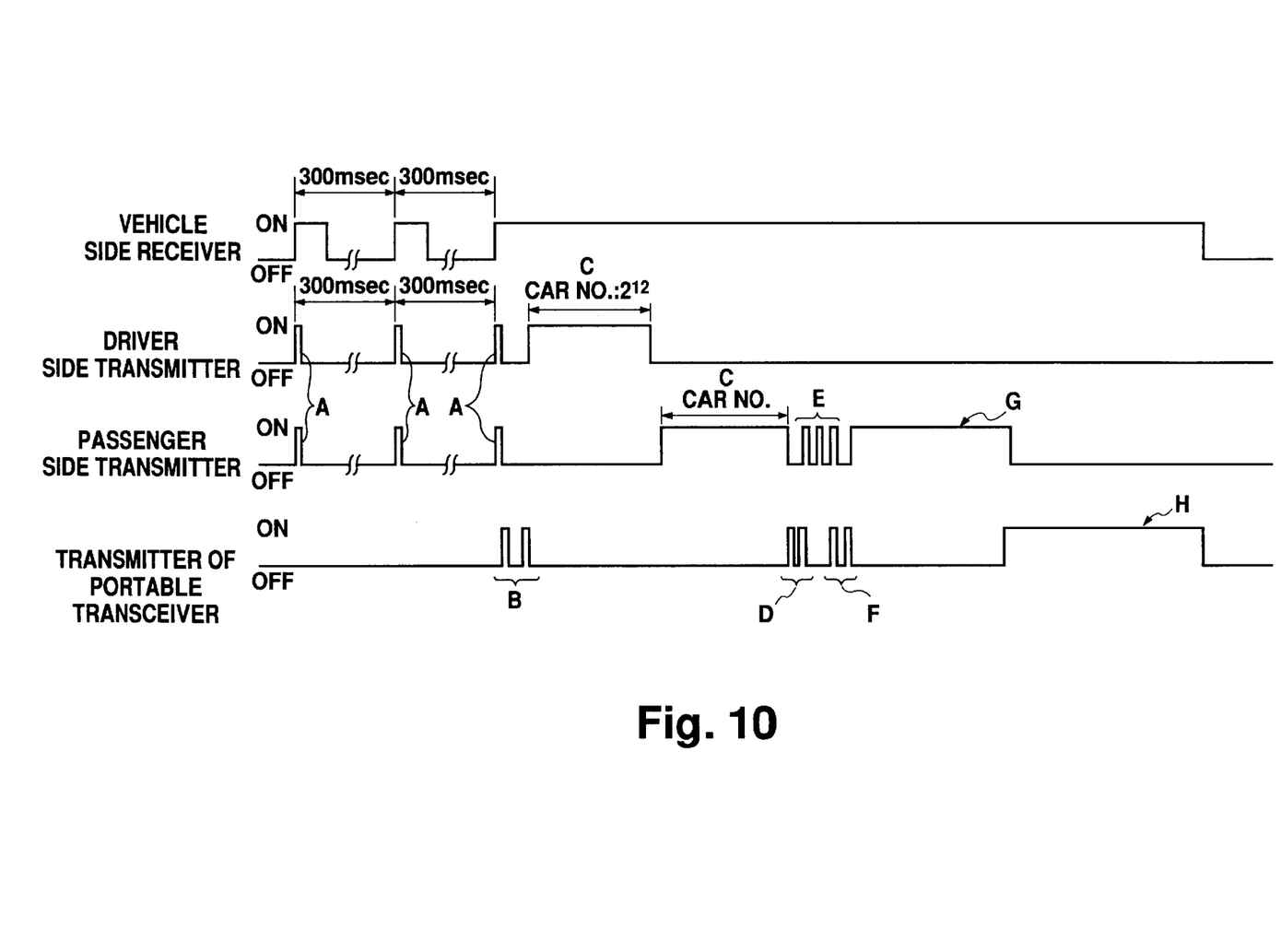
FIG. 10 is a timing chart showing operation condition of a vehicle-side system and a portable transceiver.

FIG. 9 shows a flowchart for transmission of a large area ID request signal at S201 in FIG. 8. FIG. 10 shows a timing chart indicative of operation condition of a vehicle-side system and a portable transceiver.

To conserve battery consumption, it is preferable that a large area ID request signal, having a large data amount and consuming large power for transmission, is transmitted only when response is most likely returned from a portable transceiver 12. Therefore, before transmission of a large area ID request signal, the controller 68 sends, via the driver and passenger side transmitters 66a and 66b, a signal with small power consumption, or a wake-up signal A, in a predetermined interval, such as 300 msec, to detect presence of a portable transceiver (whether or not that transceiver belongs to the concerned vehicle 10 is not detected) (S300). Each wake-up signal A is achieved through continuous transmission of a signal of, e.g., 134.2 KHz for 1 msec. A wake-up signal A is sent simultaneously to the first and second large areas 58 and 60, shown in FIG. 6. For transmission of a wake-up signal A, the controller 68 instructs the driver and passenger side transmitters 66a and 66b to transmit a wake-up signal A, and the receiver 72 to operate for a time period long enough to receive a response expected to be returned from a portable transceiver 12, if any.

Thereafter, the controller 68 detects whether or not the receiver 72 received a response from a portable transceiver 12 (S301). With no response received while the receiver 72 is operating, after a predetermined period, e.g., 300 msec, measured by a timer (S302), transmission of a wave-up signal A is again instructed at S300. With this arrangement, the receiver 72 resultantly operates substantially intermittently when no response is received. As a result, power battery consumption can be reduced. On the other hand, upon receipt of a response B with respect to a wake-up signal A, as shown in FIG. 10, in other words, when a portable transceiver 12 is present either in the first or second large areas 58 or 60, the controller 68 then sends a simple verification code, or car number C, toward the first large area on the driver side (S303). A car number C is a fixed code of, for example, 12 bits ($2^{12}$=4096 types), and used for recognition of a portable transceiver 12 belonging to a vehicle control system of this embodiment. Being a fixed code, a car number C is highly secured.

When no response from a portable transceiver 12 is received in reply to the car number C (S304), in other words, when it is not assured that a portable transceiver 12 belonging to that vehicle 10 is present in the first large area 58, the controller 68 then sends a car number C toward the second large area 60 on the passenger side, as shown in FIG. 10 (S305). When still no response is received with respect to the car number C sent toward the second large area 60 (S306), and it is not assured that a portable transceiver 12 belonging to that vehicle 10 is present in the second large area 58 or, in other words, when it is determined that the portable transceiver having entered either the first or second large area 58 or 60 is not the one belonging to a vehicle control system of this embodiment, after a lapse of a predetermined time (S302), the controller 68 sends a wake-up signal A again, as shown in FIG. 9.

On the other hand, when a response D is received at S306 with respect to the car number C sent toward the second large area 60, the controller 68 then sends a priority code E via the passenger side transmitter 66b toward the second large area 60 (S307). A priority code E is a code for detecting, in the case where a plurality of (e.g., eight, or $2^3$) portable transceivers 12 are used for one vehicle (for family or company use), which one of the plurality of portable transceivers 12 is present in the second large area 50.

When the receiver 72 receives a response F sent from the portable transceiver 12 in reply to the third priority code E, the controller 68 can thereby determine that the portable transceiver which entered the second large area 60 is the one with the third priority, and send a large area ID request code G (a large area ID request signal), unique to the portable transceiver with the third priority, to the second large area 60 (S308).

A large area ID request code G may be, for example, a 32 bit random code, and can also be referred to as a challenge code. The portable transceiver 12 generates a response code based on a challenge code according to a certain function. With this arrangement, security, which depends on a response to a challenge code, is significantly improved. Note that as many priority codes E as portable transceivers 12 used for one vehicle 10 are available. After having received a response F from a portable transceiver 12, a priority code E is no longer output, and a large area ID request code G (a large area ID request signal) will be sent instead.

Referring to S304, when a response D is received in reply to the car number C sent toward the first large area 58, the controller 68 sends a priority code E via the driver side transmitter 66a toward the first large area 58. With a response F received, the controller 68 then sends a large area ID request signal (a large area ID request code G) corresponding to the response F toward the first large area 58 (S309–S310). Thereafter, the operation flow returns to S202 (FIG. 8), where a response ID from a portable transceiver 12 is awaited.

As described above, a large area ID request signal having a large data amount and consuming large power for transmission, is transmitted only after the vehicle specified an approaching portable transceiver 12. Therefore, even when a plurality of portable transceivers 12 are used for a single vehicle 10, transmission of a large area ID request signal need be made only once. This can reduce battery consumption.

In the flowchart of FIG. 9, car numbers are sent in the directions of the driver (D), passenger (P), and driver (D) seat sides in this order. The direction for sending a car number may instead be desirably determined, such as in the order of directions D, P, P, D, D, P . . . Also, priority codes may be sent either in a predetermined order or according to a transceiver with higher priority. For example, a method in which the priority code used in previous transmission is set, through learning function of the system, to be initially transmitted in the following detection, may be preferable. Priority code transmission in this manner may increase the possibility that a large ID request signal is output more promptly, contributing to reduction of battery consumption.

It should be noted that the same advantage as that of the third embodiment using a body detection sensor can be obtained with an arrangement such as is described in the first embodiment using small areas to assure the intention of a user with a portable transceiver 12, of getting on the vehicle.

According to the present invention, an approaching user to a vehicle can be accurately detected without applying excessive detection operation, while suppressing battery consumption, to control vehicle-mounted devices at an optimum timing.

In addition, formation of large areas both on the driver and passenger sides enables detection of a user's approaching direction, and improves security. As this arrangement also reduce operation duration of the detection means, battery consumption can be further reduced.

What is claimed is:

1. A vehicle control system, comprising:

large area ID request means for sending an ID request signal to a portable transceiver present in a specific area around a vehicle to form a large area which is a substantially circular area formed with the vehicle at the center;

ID verification means for receiving a response ID in reply to the ID request signal to conduct verification with the response ID received;

area switching means for activating at least one detection means using a detection area smaller than the larger area when the response ID received is verified coincident with a reference ID; and control means for controlling operation of a vehicle-mounted device based on a detection result by the detection means.

2. A vehicle control system according to claim 1, wherein the control means controls a door-lock controller for controlling locking/unlocking operation with respect to doors of the vehicle.

3. A vehicle control system according to claim 1, wherein the large area ID request means forms a first large area and a second large area in lateral directions with respect to the vehicle on a driver side and a passenger side, respectively, at a predetermined timing, and the area switching means activates individually at least one detection area formed either on the driver side or the passenger side of the vehicle, based on a response ID sent from a portable transceiver from at least one of the first large area or the second large area.

4. A vehicle control system according to claim 1, wherein the detection means is small area ID request means for sending an ID request signal which is different from the ID request signal to be sent to the large area, and the control means controls operation of the vehicle-mounted device when the ID verification means verifies that a response ID in reply to the ID request signal sent from the small area ID request means coincides with a reference ID.

5. A vehicle control system according to claim 1, wherein the detection means is a body detection sensor for detecting an approaching vehicle user.

6. A vehicle control system according to claim 1, further comprising operation area selection means for selectively activating one detection means associated with a specific location.

7. A vehicle control system according to claim 4, further comprising area changing means for changing a transmission area for the ID request signal sent from the small area ID request means.

8. A vehicle control system according to claim 2, wherein the area switching means suspends operation of detection means associated with an unlocked door.

9. A vehicle control system according to claim 1, further comprising:

driven state detection means for detecting a driven state of the vehicle, and operation suspension means for suspending operation of the large area ID request means and the detection means while the driven state of the vehicle is detected.

10. A vehicle control system according to claim 3, wherein the large area ID request means sends a wake-up signal at a predetermined interval for detecting whether or not a portable transceiver is present around the vehicle, and forms the first large area and the second large area based on a predetermined priority order when presence of the portable transceiver is confirmed.

11. A vehicle control system according to claim 2, wherein the large area ID request means forms a first larger area and a second large area in lateral directions with respect to the vehicle on a driver side and a passenger side, respectively, at a predetermined timing, and the area switching means individually activates at least one detection area formed either on the driver side or the passenger side of the vehicle, based on a response ID sent from a portable transceiver having entered at least one of the first large area or the second large area.

12. A vehicle control system according to claim 11, wherein the detection means is small area ID request means for sending an ID request signal which is different from the ID request signal to be sent to the specific area within the large area, and the control means controls operation of the vehicle-mounted device when the ID verification means verifies that a response ID in reply to the ID request signal sent from the small area ID request means coincides with a reference ID.

13. A vehicle control system according to claim 11, wherein the detection means is a body detection sensor for detecting an approaching vehicle user.

14. A vehicle control system according to claim 11, further comprising operation area selection means for selectively activating one detection means associated with a specific location.

15. A vehicle control system according to claim 11, wherein the area switching means suspends operation of detection means associated with an unlocked door.

16. A vehicle control system according to claim 11, further comprising:
  driven state detection means for detecting a driven state of the vehicle, and
  operation suspension means for suspending operation of the large area ID request means and the detection means while the driven state of the vehicle is detected.

17. A vehicle control system according to claim 11, wherein the large area ID request means sends a wake-up signal in a predetermined interval for detecting whether or not a portable transceiver is present around the vehicle, and forms the first large area and the second large area based on a predetermined priority order when presence of the portable transceiver is confirmed.

18. A vehicle control system according to claim 12, further comprising operation area selection means for selectively activating one detection means associated with a specific location.

19. A vehicle control system according to claim 12, further comprising area changing means for changing a transmission area for the ID request signal sent from the small area ID request means.

20. A vehicle control system according to claim 12, wherein the area switching means suspends operation of detection means associated with an unlocked door.

21. A vehicle control system according to claim 12, further comprising:
  driven state detection means for detecting a driven state of the vehicle, and
  operation suspension means for suspending operation of the large area ID request means and the detection means while the driven state of the vehicle is detected.

* * * * *